United States Patent Office 3,249,569
Patented May 3, 1966

3,249,569
COAGULATION PROCESS
Joel Fantl, Springfield, Mass., assignor to Monsanto Company, a corporation of Delaware
No Drawing. Filed Aug. 27, 1962, Ser. No. 219,748
12 Claims. (Cl. 260—29.6)

This invention relates to a process for coagulating polymeric latices. More particularly, the invention relates to a method of coagulating polymeric latices so as to minimize the percentage of fines produced in recovering latex solids.

In conventional processes for recovering solids from polymeric latics by mixing an electrolyte with the latex to cause coagulation and then drying the coagulum, it is frequently found that the product contains an undesirably high percentage of fines. This production of fines appears to be attributable primarily to attrition of the polymer particles after the coagulation step, although attrition of the particles can also occur during rapid coagulation processes. Since fines, i.e., particles small enough to pass through a screen on which particles of the desired particle size are retained, (1) can create an explosion hazard during drying, (2) present compounding problems when the polymer is subsequently blended with various additives, and (3) represent a loss of polymer when they are separated and discarded prior to compounding the polymer with additives, it is naturally desirable to minimize the production of fines in these processes.

An object of the invention is to provide a novel process for coagulating polymeric latices.

Another object is to provide a method of coagulating polymeric latices so as to minimize the percentage of fines produced in recovering latex solids.

These and other objects are attained by conducting the coagulation of a polymeric latex by admixture with an electrolyte in the presence of a water-soluble, non-ionic polymer.

The following examples and descriptions are given to illustrate the invention. Unless otherwise specified, quantities mentioned are quantities by weight.

GRAFT COPOLYMER LATEX A

Graft Copolymer Latex A is a 33% solids latex prepared by polymerizing 50 parts of a styrene-acrylonitrile (80:20) mixture to substantially complete conversion in an aqueous emulsion of 100 parts of a rubbery butadiene-styrene (90:10) copolymer cross-linked with a minor amount of divinylbenzene.

GRAFT COPOLYMER LATEX B

Graft Copolymer Latex B is a 43% solids latex prepared in the same manner as Graft Copolymer Latex A except for the use of smaller amounts of water in the polymerization process in order to obtain the higher solids content.

POLYETHYLENE OXIDE A

Polyethylene Oxide A is a water-soluble ethylene oxide polymer, a 1% aqueous solution of which has a viscosity of 3000 cps. at 25° C.

POLYETHYLENE OXIDE B

Polyethylene Oxide B is a water-soluble ethylene oxide polymer, a 1% aqueous solution of which has a viscosity of 7000 cps. at 25° C.

EXAMPLE I

Part A—Control

Feed a mixture of 450 parts of Graft Copolymer Latex A and 410 parts of a 33% solids latex of a styrene-acrylonitrile (80:20) copolymer into a mixing chamber at a constant rate. Simultaneously feed about 138 parts of a 1.5% aqueous solution of $MgSO_4$ into the mixing chamber through a second inlet at a slower constant rate proportional to the smaller size of the charge. Continuously advance the mixed charges through the mixing chamber with vigorous agitation. Recover the paste-like coagulum at the outlet end of the chamber.

Test the resistance of the coagulum to attrition by (a) pressing the coagulum through a ⅛ inch-thick plate punched with ⅛ inch-diameter holes at a rate of 3-7 inches/minute/hole to form pellets, (b) allowing 5-7 grams of the pellets to drop into a cylindrical glass vessel (inner diameter 2¼ in.; height, 3½ in.) containing 125–130 ml. of a 0.25% aqueous solution of $MgSO_4$, (c) inserting a solid cylindrical bob (diameter, 1⅞ in.; length, 3⅜ in.) concentrically with the vessel so that its flat base is ¼ inch above the base of the vessel, (d) rotating the bob about its cylindrical axis at 60 r.p.m. for 60 seconds, and (e) screening the sheared pellets to separate the particles which are smaller than 30 mesh.

The percent break-up, i.e., the percentage of the particles which are smaller than 30 mesh, is shown in Table I (Experiment 1).

Part B

Perform Experiments 2–8 by repeating Part A except for employing as the coagulant solution about 138 parts of an aqueous solution of (a) 1.5% of $MgSO_4$ and (b) respectively, about 0.02%, 0.05%, 0.07%, 0.1%, 0.11%, 0.15%, and 0.2% of Polyethylene Oxide A. The amounts of polyethylene oxide employed per 100 parts of latex solids and the break-up values determined when the coagula are tested for resistance to attrition are shown in Table I.

TABLE I

| Experiment | Parts of Polyethylene Oxide/100 Parts of Latex Solids | Percent Break-up |
|---|---|---|
| 1 (Control) | 0 | 37 |
| 2 | 0.01 | 26 |
| 3 | 0.025 | 29 |
| 4 | 0.035 | 15 |
| 5 | 0.05 | 11 |
| 6 | 0.055 | 8 |
| 7 | 0.075 | 12 |
| 8 | 0.1 | 19 |

As demonstrated above, the presence of a water-soluble, non-ionic polymer during the coagulation of a polymeric latex with $MgSO_4$ results in increasing the resistance of the coagulated particles to attrition. Because of this increased resistance of the particles to attrition, fewer fines are produced in recovering dried solids from the polymeric latex.

EXAMPLE II

Repeat Example I except for employing $CaCl_2$ as the coagulant instead of $MgSO_4$. Similar results are observed.

EXAMPLE III

Repeat Example I except for employing $Al_2(SO_4)_3$ as the coagulant instead of $MgSO_4$. Similar results are observed.

EXAMPLE IV

Coagulate eight latices in the presence of the same amounts of Polyethylene Oxide A as in Example I (i.e., respectively, about 0%, 0.01%, 0.025%, 0.035%, 0.05%, 0.055%, 0.075%, and 0.1%, based on latex solids) by repeating Example I except for introducing the polyethylene oxide via the latex charge instead of via the coagulant charge. In each experiment in which Polyethylene Oxide A is to be used, incorporate it by intimately mixing 60 parts of an aqueous solution of the polyethylene oxide with the mixed polymeric latices prior to feeding the charge into the coagulation chamber. Similar results are observed.

EXAMPLE V

Repeat Example I except for introducing Polyethylene Oxide A (when employed) via a third charge to the mixing chamber rather than via the coagulant charge. Feed this third charge—60 parts of an aqueous solution of Polyethylene Oxide A—into the mixing chamber through a third inlet simultaneously with feeding the latex and coagulant charges and at a slower constant rate proportional to the smaller size of the charge. Employ the same amounts of Polyethylene Oxide A as in Part B of Example I, i.e., about 0.01%, 0.025%, 0.035%, 0.05%, 0.055%, 0.075%, and 0.1%, based on latex solids. Similar results are observed.

EXAMPLE VI

Part A—Control

Feed a mixture of 350 parts of Graft Copolymer Latex B and 410 parts of a 33% solids latex of a styrene-acrylonitrile (80:20) copolymer into a mixing chamber at a constant rate. Simultaneously feed about 122 parts of 1.5% aqeuous solution of $MgSO_4$ into the mixing chamber through a second inlet at a slower constant rate proportional to the smaller size of the charge. Continuously advance the mixed charges through the mixing chamber with vigorous agitation. Recover the paste-like coagulum at the outlet end of the chamber. Test for resistance of the coagulum to attrition as in Example I. The percent break-up result is shown in Table II (Experiment 9).

Part B

Perform Experiments 10–14 by repeating Part A except for employing as the coagulant solution about 122 parts of an aqueous solution of (a) 1.5% of $MgSO_4$ and (b) respectively, about 0.023%, 0.058%fi, 0.082%, 0.117%, and 0.164% of Polyethylene Oxide B. The amounts of polyethylene oxide employed per 100 parts of latex solids and the break-up values determined when the coagula are tested for resistance to attrition values determined when the coagula are tested for resistance to attrition are shown in Table II.

TABLE II

| Experiment | Parts of Polyethylene Oxide/ 100 Parts of Latex Solids | Percent Break-up |
| --- | --- | --- |
| 9 (Control) | 0 | 21 |
| 10 | 0.01 | 16 |
| 11 | 0.025 | 9 |
| 12 | 0.035 | 8 |
| 13 | 0.05 | 12 |
| 14 | 0.07 | 15 |

EXAMPLE VII

Perform five experiments by repeating Part A of Example VI except for employing as the coagulant solution about 122 parts of an aqueous solution of (a) 1.5% of $MgSO_4$ and (b) a variable concentration of a water-soluble polyacrylamide which has a Staudinger average molecular weight of about 1,000,000 and a 1% aqueous solution of which has a viscosity of about 250 cps. at 25 C. Employ the polyacrylamide in such amounts as to constitute, respectively, about 0.02%, 0.04%, 0.06%, 0.08%, and 0.1%, based on latex solids. Test the coagula for resistance to attrition as in Example I. The products exhibit less break-up than the control product of Example VI.

EXAMPLE VIII

Divide a 10% solids latex of polyvinyl chloride into five aliquots consisting of 300 parts of latex. Coagulate each of the samples by adding an aqueous solution containing 0.7 part of $MgSO_4$ and a variable amount (i.e., 0, 0.006, 0.012, 0.015, and 0.018 part, respectively) of Polyethylene Oxide A with vigorous agitation. Test for resistance of the coagula to attrition as in Example I. The products obtained by coagulation in the presence of Polyethylene Oxide A exhibit less break-up than the product obtained by coagulation in the absence of the polyethylene oxide.

EXAMPLE IX

Divide a 30% solids latex of polystyrene into four aliquots consisting of 400 parts of latex. Coagulate each of the samples by adding an aqueous solution containing 0.9 part of $CaCl_2$ and a variable amount (i.e., 0, 0.012, 0.024, and 0.048 part, respectively) of Polyethylene Oxide B with vigorous agitation. Test the coagula for resistance to attrition as in Example I. The products obtained by coagulation in the presence of polyethylene Oxide B exhibit less break-up than the product obtained by coagulation in the absence of the polyethylene oxide.

The process of the invention is an improved coagulation process wherein the electrolyte-coagulation of a polymeric latex is conducted in the presence of a water-soluble, non-ionic polymer.

Water-soluble, non-ionic polymers suitable for use in the practice of the invention include, e.g., polyalkylene oxides such as polyethylene oxides, polypropylene oxides, polybutylene oxides, ethylene oxide-propylene oxide copolymers, etc.; cellulose ethers such as methyl cellulose, etc.; polyvinyl alcohol; polyallyl alcohol; vinyl alkyl ether polymers such as polyvinyl methyl ether, etc.; vinyl lactam polymers such as polyvinyl pyrrolidone, etc.; acrylamide polymers such as polyacrylamide, polymethacrylamide, copolymers of acrylamide with minor amounts of comonomers (e.g., alkyl acrylates, vinyl acetate, vinyl alkyl ethers, vinyl chloride, styrene, etc.); and other polymeric materials which fulfill the requirements of being water-soluble and non-ionic. Water-soluble ionic polymers are inoperable in the practice of the invention. The polymers preferably have Staudinger average molecular weights at least as high as 500,000, although polymers having molecular weights as low as 250,000 can also be used. The molecular weight of the polymer can be as high as is consistent with the requirement that the polymer be water-soluble. The water-soluble polymers are employed in concentrations sufficient to increase the resistance of coagulated particles to attrition but insufficient to stabilize the latex which is to be coagulated, the optimum concentration naturally varying with the molecular weight and chemical composition of the polymer.

The preferred water-soluble, non-ionic polymers are the polyalkylene oxides, particularly the polyethylene oxides. Since the lower molecular weight polymers have to be used in larger amounts to achieve optimum results and the higher molecular weight polymers are more difficult to mix with the latex, it is ordinarily preferred that the polyalkylene oxide have a molecular weight such that a 1% aqueous solution of the polymer has a viscosity of about 1000–10,000 cpt. at 25° C. Such polymers are best employed in concentrations of about 0.01–0.1%, preferably about 0.02–0.08%, based on the weight of latex solids. Lower concentrations ordinarily are not sufficiently effective in the practice of the invention; higher concentrations are usually avoided—particularly when the higher molecular weight polymers are employed—to prevent stabilizing the latex, although at least the lower molecular weight polymers can be used in concentrations higher than 0.1% without stabilizing the latex.

The manner of incorporating the water-soluble, non-ionic polymer is not critical as long as it is present during the admixture of the latex and the coagulant: it can be pre-mixed with the latex or the coagulant or can be incorporated during the admixture of the latex and coagulant. It is most conveniently incorporated by pre-mixing it with the coagulant (usually by dissolving the coagulant in a dilute solution of the water-soluble, non-ionic polymer or, alternatively, by dissolving the polymer in a dilute solution of the coagulant) because of the greater ease of mixing permitted by this method of incorporation.

The process of the invention—apart from the use of a water-soluble, non-ionic polymer as a coagulation modifier—is conducted by any of the known techniques for coagulating a polymeric latex with an electrolyte. Coagulation, as is well known, is accomplished simply by mixing the latex and electrolyte in any suitable manner at a temperature above the freezing temperature and below the boiling temperature of the latex, the amount of electrolyte employed varying with several factors such as the solids content of the latex, the particle size of the latex, the amount of emulsifying agent in the latex, the particular electrolyte used, etc. The latex and electrolyte are usually mixed by adding the latex to an aqueous solution of the electrolyte, adding the electrolyte (usually as a dilute aqueous solution) to the latex, or simultaneously feeding the latex and an aqueous solution of electrolyte to a mixing chamber. Temperatures of about 5–30° C. are frequently preferred; agitation is normally continued throughout the coagulation.

Among the electrolytes usually used in these coagulation processes are inorganic acids such as hydrochloric acid, sulfuric acid, etc.; organic acids such as formic acid, oxalic acid, acetic acid, etc.; and water-soluble metal salts such as the chlorides, nitrates, sulfates, and acetates of sodium, potassium, zinc, calcium, magnesium, aluminum, etc. The water-soluble salts of polyvalent metals are especially preferred.

Polymeric latices which are coagulated by admixture with electrolytes include latices of a variety of types of water-insoluble vinylidene polymers, e.g., rubbery polymers of conjugated 1,3-dienes such as butadiene, isoprene, piperylene, chloroprene, etc.; rubbery and resinous copolymers of such dienes with one or more comonomers such as styrene, alpha-methylstyrene, methyl methacrylate, acrylonitrile, etc.; polymers of one or more monovinylidene monomers such as acrylonitrile, methacrylonitrile, alkyl acrylates and methacrylates (e.g., methyl acrylate, ethyl acrylate, butyl acrylate, 2-ethylhexyl acrylate, the corresponding methacrylates, etc.), monovinylidene aromatic monomers (e.g., styrene, alpha-methylstyrene, o-methyl- and other ar-alkylstyrenes, p-chloro- and other ar-halostyrenes, vinyl naphthalene, etc.); and mixtures of such polymers. These latices contain emulsifying agents, e.g., fatty acid soaps, which keep the polymer particles dispersed in the aqueous medium until the latex and coagulant are mixed, and they frequently contain optional additives such as antioxidants, heat and light stabilizers, pigments, etc.

The coagulations of polymeric latices wherein the polymer has a second order transition temperature above room temperature appear to be especially benefited by the presence of a water-soluble, non-ionic polymer. A preferred embodiment of the invention is the use of a water-soluble, non-ionic polymer in the electrolyte-coagulation of:

(1) A latex of a graft copolymer of (a) a monovinylidene aromatic monomer such as styrene; ar-alkylstyrenes, e.g., o-, m-, and p-methylstyrenes, 2,5-dimethylstyrene, p-butylstyrene, etc.; ar-halostyrenes, e.g., o-, m-, and p-chlorostyrenes, p-bromostyrene, 2,5-dichlorostyrene, 2-chloro-4-methylstyrene, etc.; alpha-alkylstyrenes such as alpha-methylstyrene; vinyl naphthalene; and mixtures thereof and/or (b) an acrylic monomer such as acrylonitrile; methacrylonitrile; a $C_1$–$C_4$ alkyl acrylate or methacrylate, e.g., methyl acrylate, butyl methacrylate, etc.; and mixtures thereof on (c) a rubbery polymer of a conjugated 1,3-diene, e.g., natural rubber, homopolymers of butadiene, isoprene, chloroprene, etc., copolymers of two or more such dienes, copolymers of at least 50% by weight of one or more such dienes with one or more comonomers such as the monovinylidene aromatic monomers and acrylic monomers mentioned above and (2) Mixed latices of such graft copolymers and polymers of at least one of the monomers of the grafted phase of the graft copolymer.

A particularly preferred embodiment of the invention relates to the electrolyte-coagulation of mixed latices of (A) a graft copolymer of (1) about 15–90 parts by weight of a mixture of 20–95% by weight of a monovinylidene aromatic monomer (especially styrene or a mixture of styrene and alpha-methylstyrene) and 80–5% by weight of an acrylic monomer (especially acrylonitrile) on (2) 100 parts by weight of a rubbery polymer of a conjugated 1,3-diene (especially a cross-linked butadiene polymer containing up to about 20% by weight of combined styrene and/or acrylonitrile) and (B) a copolymer of 20–95% by weight of a combined monovinylidene aromatic monomer and 80–5% by weight of a combined acrylic monomer.

The products of the coagulation processes of the invention can be dried by conventional techniques—advantageously by synergizing, hardening, centrifuging, and oven-drying the coagulum—to yield dried solids containing as little as one-third the number of fines which are produced when a water-soluble, non-ionic polymer is not employed as a coagulation modifier. Thus, in providing a means of increasing the resistance of the coagulated particles to attrition, the process of the invention provides a means of increasing the yield of quality polymer solids as well as minimizing the compounding and explosion problems associated with the production of fines.

It is obvious that many variations can be made in the products and processes set forth above without departing from the spirit and scope of this invention.

What is claimed is:

1. In a process for coagulating a polymeric latex wherein coagulation is accomplished by mixing the latex with an electrolyte at a temperature above the freezing temperature and below the boiling temperature of the latex, the improvement which comprises conducting the coagulation in the presence of about 0.01–0.1% of a water-soluble, non-ionic polymer, based on the weight of latex solids.

2. The process of claim 1 wherein the electrolyte is a water-soluble salt of a polyvalent metal.

3. The process of claim 1 wherein the water-soluble, non-ionic polymer is mixed with the electrolyte prior to admixing the latex and electrolyte.

4. The process of claim 1 wherein the polymeric latex is a latex of a graft copolymer of a monomer of the group consisting of styrene, an ar-alkylstyrene, an ar-halostyrene, an alpha-alkylstyrene, vinyl naphthalene, acrylonitrile, methacrylonitrile, a $C_1$–$C_4$ alkyl acrylate, a $C_1$–$C_4$ alkyl methacrylate, and mixtures thereof on a rubbery polymer of a conjugated 1,3-diene, of the group consisting of butadiene, isoprene, piperylene, chloroprene, and mixtures thereof.

5. The process of claim 1 wherein the polymeric latex is a mixture of (a) a latex of a graft copolymer of a monomer of the group consisting of styrene, an ar-alkylstyrene, an ar-halostyrene an alpha-alkylstyrene, vinyl naphthalene, acrylonitrile, methacrylonitrile, a $C_1$–$C_4$ alkyl acrylate, a $C_1$–$C_4$ alkyl methacrylate, and mixtures thereof on a rubbery polymer of a conjugated 1,3-diene of the group consisting of butadiene, isoprene, piperylene, chloroprene, and mixtures thereof and (b) a latex of a polymer of a monomer of the group consisting of styrene, an ar-alkylstyrene, an ar-halostyrene, an alpha-alkylstyrene, vinyl naphthalene, acrylonitrile, methacrylonitrile, a $C_1$–$C_4$ alkyl acrylate, a $C_1$–$C_4$ alkyl methacrylate, and mixtures thereof.

6. The process of claim 1 wherein the polymeric latex is a latex of a water-insoluble vinylidene polymer having a second order transition temperature above room temperature.

7. The process of claim 1 wherein the water-soluble, non-ionic polymer is a polymer of the group consisting of a polyethylene oxide, a polypropylene oxide, a polybutylene oxide, an ethylene oxide-propylene oxide copolymer, a cellulose ether, a polyvinyl alcohol, a polyallyl alcohol, a vinyl alkyl ether polymer, a vinyl lactam polymer, and an acrylamide polymer.

8. The process of claim 7 wherein the water-soluble, non-ionic polymer is a polyethylene oxide.

9. The process of claim 8 wherein the polyethylene oxide is a polyethylene oxide, a 1% aqueous solution of which has a viscosity of about 1000–10,000 cps. at 25° C.

10. In a process for coagulating a latex of a water-insoluble vinylidene polymer having a second order transition temperature above room temperature wherein coagulation is accomplished by mixing the latex with an electrolyte at a temperature above the freezing temperature and below the boiling temperature of the latex, the improvement which comprises conducting the coagulation in the presence of about 0.01–0.1%, based on the weight of latex solids, of a polyethylene oxide, a 1% aqueous solution of which has a viscosity of about 1000–10,000 cps. at 25° C.

11. The process of claim 10 wherein the electrolyte is a water-soluble salt of a polyvalent metal.

12. In a process for coagulating a mixture of (a) a latex of a graft copolymer of a monomer of the group consisting of styrene, an ar-alkylstyrene, an ar-halostyrene, an alpha-alkylstyrene, vinyl naphthalene, acrylonitrile, methacrylonitrile, a $C_1$–$C_4$ alkyl acrylate, a $C_1$–$C_4$ alkyl methacrylate, and mixtures thereof on a rubbery polymer of a conjugated 1,3-diene of the group consisting of butadiene, isoprene, piperylene, chloroprene, and mixtures thereof and (b) a latex of a polymer of a monomer of the group consisting of styrene, an ar-alkylstyrene, an ar-halostyrene, an alpha-alkylstyrene, vinyl naphthalene, acrylonitrile, methacryolnitrile, a $C_1$–$C_4$ alkyl acrylate, a $C_1$–$C_4$ alkyl methacrylate, and mixtures thereof wherein coagulation is accomplished by mixing the mixture of latices with a water-soluble salt of a polyvalent metal at a temperature above the freezing temperature and below the boiling temperature of the latex mixture, the improvement which comprises conducting the coagulation in the presence of about 0.01–0.1%, based on the weight of latex solids, of a polyethylene oxide, a 1% aqueous solution of which has a viscosity of about 1000–10,000 cps. at 25° C.

References Cited by the Examiner
UNITED STATES PATENTS

| | | | |
|---|---|---|---|
| 2,791,567 | 5/1957 | Lowe et al. | 260—29.7 |
| 2,802,808 | 8/1957 | Hayes | 260—880 |

MURRAY TILLMAN, *Primary Examiner.*

LOUISE P. QUAST, *Examiner.*

J. ZIEGLER, *Assistant Examiner.*